2,964,869

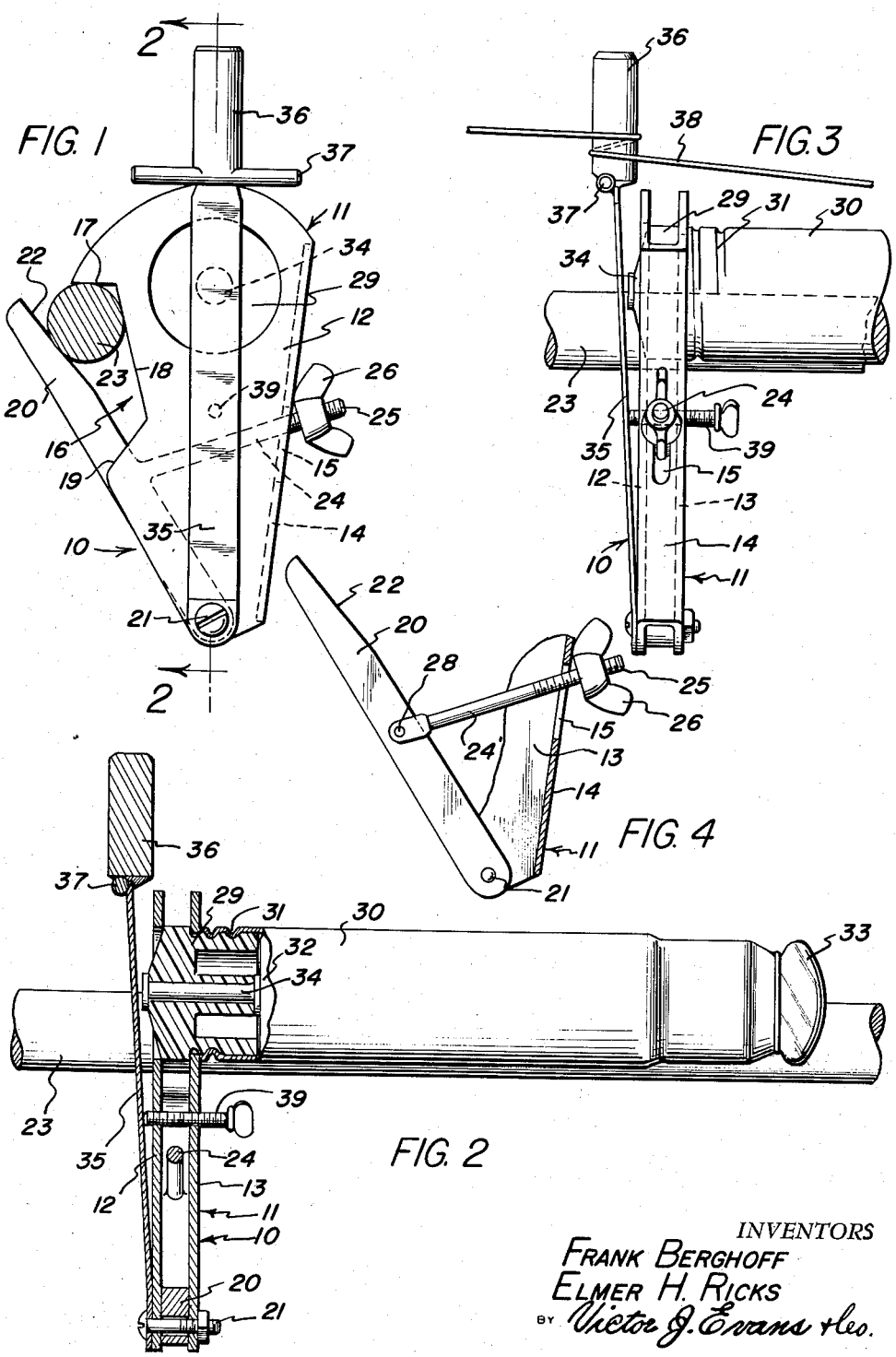

FISHING SIGNAL LIGHT

Frank Berghoff, 3014 South St., and Elmer H. Ricks, 1207 Brown St., both of Lafayette, Ind.

Filed May 20, 1958, Ser. No. 736,524

5 Claims. (Cl. 43—17)

This invention relates to a signal device, and more particularly to a signal device for use with a fishing rod or pole.

The object of the invention is to provide a signal device which is adapted to be attached to a conventional fishing rod so that when a fish strikes the line, the signal will be actuated so that the fisherman will know that it is time to reel in the line.

Another object of the invention is to provide a signal device which is adapted to be connected to a fishing rod, so that when a fish strikes or engages the hook, a light bulb will be energized or actuated so that with a person fishing at night, the fisherman will be able to readily ascertain that the line should be reeled in in order to retrieve the fish.

A further object of the invention is to provide a signal device which can be connected to a fishing rod for use as a signaling device to advise a fisherman when a fish strikes the line, and wherein the device can be readily disconnected from the fishing rod so that the device can be used as a flashlight.

Another object of the invention is to provide a signal light which is extremely simple and inexpensive to manufacture.

Other objects and advantages will be apparent in the course of the following description.

In the accompanying drawing, forming a part of this application, and in which like numerals are used to designate like parts throughout the same:

Figure 1 is an end elevational view of the signal light of the present invention, and showing the device attached to a fishing rod, and the fishing rod being shown in section.

Figure 2 is a sectional view taken on line 2—2 of Figure 1.

Figure 3 is a view taken at right angles to the view shown in Figure 1.

Figure 4 is a fragmentary sectional view illustrating a modification.

Referring in detail to the drawing, the numeral 10 indicates the signal light of the present invention, and the signal light 10 includes a support member which is indicated generally by the numeral 11. The support member 11 includes first and second spaced parallel wall members 12 and 13, Figure 2, and the support member 11 further includes a web 14 which extends between the wall members 12 and 13 and which is secured thereto or formed integral therewith. The web 14 is provided with a slot 15, Figure 3, for a purpose to be later described. As shown in Figure 1, for example, the pair of wall members 12 and 13 are provided with opposed cutouts 16 which define first, second, and third flat surfaces 17, 18, and 19.

The numeral 20 indicates a lever which has one end suitably connected between the wall members 12 and 13 as by means of a pivot pin 21. The lever 20 is provided with a jaw portion 22 which is adapted to coact with the surfaces 17 and 18 whereby the device may be readily clamped to a portion of a fishing rod 23.

Extending from the lever 20 is a rod 24, and the rod 24 projects through the slot 15 in the web 14. The rod 24 is threaded as at 25, and a securing element such as a wing nut 26 is arranged in threaded engagement with the portion 25. As shown in Figures 1, 2, and 3 the rod 24 is rigidly secured to the lever 20. However, in Figure 4 there is illustrated a modification wherein the numeral 24' indicates a rod which is pivotally connected to the lever 20 as for example, by means of a pivot pin 28.

Carried by the support member 11 is an insulated bushing 29. The numeral 30 indicates a battery case which is detachably connected to the bushing 29, as for example by means of a threaded connection 31. The numeral 32 indicates a battery which is arranged in the case 30. Carried by one end of the battery case 30 is a light bulb 33, and the numeral 34 indicates a contact which extends through the bushing 29 and engages the battery 32.

There is further provided a spring clip member 35 which has one end anchored in place by means of a pin or bolt 21, and the other end of the spring member 35 has a base piece 36 connected thereto. A guide member 37 is arranged contiguous to the base piece 36, and the numeral 38 indicates a conventional fishing line which is adapted to be wrapped around or trained around the base piece 36. A screw member 39 is adjustably connected to the support member 11, and an end of the screw member 39 abuts or engages the spring member 35.

From the foregoing it is apparent that there has been provided a signal light which is especially suitable for use on a fishing rod, and with the device 10 connected to a fishing rod such as the rod 23, it will be seen that with the parts arranged as shown in the drawing, when a fish strikes the line, the bulb 33 will be energized so that a fisherman will be advised that a fish is on the hook or line so that the line with the fish can be pulled in the usual manner.

According to the present invention, the wing nut 26 can be loosened so as to permit a lever 20 to move away from the cutout 16 whereby sufficient clearance is provided for permitting the rod 23 to be raised as shown in Figure 1 for example. Then, the wing nut 26 is tightened on the portion 25 so that the portion 22 of the lever 20 will coact with the surfaces 17 and 18 to clamp the fishing rod 23 therebetween and the device will be maintained on the fishing rod. The member 24 may be rigidly secured to the lever 20 or else the member 24' can be pivotally connected to the lever 20 as shown in Figure 4. By the means of the wing nut 26 and the pivotally mounted lever 20, it will be seen that the device can be mounted on rods of different sizes or shapes.

When the device is to be removed from the fishing rod such as the rod 23, it is only necessary to loosen the wing nut 26 whereby the lever 20 can pivot to permit removal of the device from the fishing rod.

It is to be noted that when the device is being used, and with the device connected to the fishing rod as previously described, a portion of the fishing line 38 is trained around or wrapped around the base piece 36, as for example as shown in Figure 3. Then, when a fish strikes the line or hook, the line 38 will be placed under tension so as to move the spring member 35 into engagement with the contact 34 and this will complete the electrical circuit to the bulb 33 so that the bulb 33 will be turned on or energized. Thus, a fisherman will know that it is time to pull in the line so as to catch the fish. The guide member 37 which is arranged below the base piece 36 helps insure that the line 38 will not slip off the base piece 36. As shown in Figures 2 and 3 for example, the screw member 39 is adjustably connected to the support member 11 and engages the spring member 35, so that by manually rotating the screw member 39, the amount of play or movement of the spring member 35 necessary to engage the contact 34 can be regulated as desired. Due to the provision of the threaded connection 31 between the battery case 30 and the bushing 29, it will be seen that the case 30 may be readily unscrewed or detached from the bushing 29 as for example when the battery 32 is to be replaced or removed.

The parts can be made of any suitable material and in different shapes or sizes.

The device is constructed so that false signalling is prevented, and when pressure is released from the line the inherent resiliency of the spring member 35 will open the circuit between the spring member 35 and contact 34 so that the bulb 33 will be off. The shape of the cutout 16 insures that the device will be properly clamped on to a fishing rod such as the rod 23.

The present invention serves to flash a signal, and the device is especially suitable for night fishing, but it is to be understood that the device is not restricted to such use. The device can be adjusted so that it can flash a signal at various degrees of pull on the line, and the screw member 39 can be adjusted so that the device can be set to such a manner that different amounts of pull will complete the circuit depending upon the desires of the user.

Furthermore, the device can be readily attached to the rod 23 so that it can be used as a flashlight and also it can be carried in a person's pocket or tackle box and by rotating the screw member 39 in the proper direction, the spring member 35 can be held away from the contact 34 so as to prevent accidental lighting of the bulb 33. The device can be used on fishing rods with reels attached, or else it can be used on plain fishing poles without reels, or it can be used on any other type of fishing equipment. With the device attached to the fishing rod, the user does not have to be near the rod since when a fish strikes the line and nibbles on the bait, the light will go on so that the fisherman can take the necessary action to retrieve the fish. The device can be set or adjusted so that it will operate for nibbles, bites, runs or the like, and there will be no unnecessary drain on the battery 32 since when tension is released from the line 38, the bulb 33 will be off.

Minor changes and shapes, size and rearrangement of details coming within the field of invention claimed, may be restored to in actual practice, if desired.

We claim:

1. In a fishing signal light, a support member, including first and second spaced parallel wall members and a connecting web, there being a slot in said web, said wall members being provided with opposed cutouts which define flat surfaces, a lever having one end pivotally connected to said wall members, said lever having a jaw portion mounted to move toward and away from said cutouts, a rod extending from said lever and projecting through said slot, the outer end of said rod being threaded, securing elements arranged for engagement with said threaded rod, an insulated bushing mounted in said support member, a battery case connected to said bushing, a bulb connected to the outer end of said case, a contact carried by said bushing, a spring member having one end pivotally connected to said support member, said spring member being mounted to move into and out of engagement with said contact, a screw member adjustably connected to said support member and engaging said spring member, a base piece connected to the free end of the spring member, and a guide member arranged contiguous to said base piece.

2. In a fishing signal light, a support member including first and second spaced parallel wall members and a connecting web, there being a slot in said web, said wall members being provided with opposed cutouts which define flat surfaces, a lever having one end pivotally connected to said wall members, said lever having a jaw portion mounted to move toward and away from said cutouts, a rod extending from said lever and projecting through said slot, the outer end of said rod being threaded, securing elements arranged for engagement with said threaded rod, an insulated bushing mounted in said support member, a battery case detachably connected to said bushing, a bulb connected to the outer end of said case, a contact carried by said bushing, a spring member having one end pivotally connected to said support member, said spring member being mounted to move into and out of engagement with said contact, a screw member adjustably connected to said support member and engaging said spring member, a base piece connected to the free end of the spring member, and a guide member arranged contiguous to said base piece, said base piece having a portion of a fishing line trained therearound, the jaw portion of said lever coacting with said cutout to clampingly engage a portion of the fishing rod therebetween.

3. The structure as defined in claim 2 wherein said rod is rigidly secured to said lever.

4. The structure as defined in claim 2 wherein said rod is pivotally connected to said lever.

5. A fishing signal light comprising a support member embodying wall members and a connecting web, there being a slot in said web, said wall members being provided with opposed cutouts which define flat surfaces, a lever having one end pivotally connected to said wall members, said lever having a jaw portion mounted to move toward and away from said cutouts, a rod extending from said lever and projecting through said slot, a battery case operatively connected to said support member, a bulb connected to the outer end of said case, a contact operatably connected to said battery case, a spring member having one end pivotally connected to said support member, said spring member being mounted to move into and out of engagement with said contact, a screw member adjustably connected to said support member and engaging said spring member, a base piece connected to the free end of the spring member, and a guide member arranged contiguous to said base piece.

References Cited in the file of this patent

UNITED STATES PATENTS

| | | |
|---|---|---|
| 2,572,333 | Kuczynski et al. | Nov. 6, 1951 |
| 2,619,559 | Schenkel | Nov. 25, 1952 |
| 2,745,088 | Bauer | May 8, 1956 |

FOREIGN PATENTS

| | | |
|---|---|---|
| 463,794 | Canada | Mar. 21, 1950 |